United States Patent [19]
Nakagawa et al.

[11] Patent Number: 5,634,165
[45] Date of Patent: May 27, 1997

[54] CAMERA WITH DEVICE TO PREVENT ACCIDENTAL DROPPING OF FILM CARTRIDGE

[75] Inventors: Yoshio Nakagawa, Sakai; Kazuhiko Kojima, Kyoto, both of Japan

[73] Assignee: Minolta Co., Ltd., Osaka, Japan

[21] Appl. No.: 562,995

[22] Filed: Nov. 27, 1995

[30] Foreign Application Priority Data

Dec. 2, 1994 [JP] Japan .................................. 6-329358

[51] Int. Cl.⁶ .................. G03B 17/02; G03B 17/26
[52] U.S. Cl. ................................ 396/538; 396/516
[58] Field of Search ..................... 354/21, 174, 275, 354/288; 352/74; 396/512, 516, 535, 538

[56] References Cited

U.S. PATENT DOCUMENTS

| | | | |
|---|---|---|---|
| 5,159,365 | 10/1992 | Takahashi et al. | 354/275 |
| 5,258,793 | 11/1993 | Tsuji et al. | 354/288 |
| 5,430,515 | 7/1995 | Lawther et al. | 354/275 |
| 5,477,295 | 12/1995 | Lawther et al. | 354/275 |
| 5,526,084 | 6/1996 | Kataoka et al. | 396/538 |

FOREIGN PATENT DOCUMENTS

| | | |
|---|---|---|
| 4-001624 | 7/1992 | Japan . |
| 5-119391 | 5/1993 | Japan . |
| 5-158142 | 6/1993 | Japan . |
| 6-043543 | 2/1994 | Japan . |

*Primary Examiner*—A. A. Mathews
*Attorney, Agent, or Firm*—Burns, Doane, Swecker & Mathis, LLP

[57] ABSTRACT

A camera having a cartridge bay into which a film cartridge is inserted includes a cover that can be opened and closed, and that covers the opening of the cartridge bay in order to block light. A force applying device applies force to a film cartridge inserted in the cartridge bay in the direction in which the film cartridge is ejected out of the cartridge bay. A prevention member prevents the film cartridge from flying completely out of the cartridge bay due to the force applied by the force applying device, such that only a part of the film cartridge protrudes out of the camera. The prevention member operates in response to the opening of the cartridge bay cover, and when the cartridge bay cover is partially open, the prevention member is set at a position at which it prevents the film cartridge from flying out. When the cartridge bay cover is fully open, the prevention member is set at a retracted position to enable the removal of the film cartridge.

16 Claims, 6 Drawing Sheets

CAMERA WITH DEVICE TO PREVENT ACCIDENTAL DROPPING OF FILM CARTRIDGE

BACKGROUND OF THE INVENTION

1. Field of the Invention

The present invention pertains to a camera that is capable of preventing the film cartridge from falling out when it is removed from the cartridge bay.

2. Description of the Prior Art

Film cartridges of the type in which the film is housed completely inside the film cartridge (hereinafter "cartridge") have been conventionally proposed. A camera using a cartridge of this type is constructed in a manner which allows the placement and removal of the cartridge. For example, such a camera may use the drop-in method, in which the cartridge is dropped in the cartridge bay opening in a direction along the film spool axis. A camera of this type has a construction such that the cartridge is removed from the cartridge bay by means of (1) lifting the cartridge by means of the human force used to open the cartridge bay cover, or (2) lifting the cartridge using spring force (e.g., Japanese Laid-Open Patents Hei 4-1624 and Hei 5-158142).

ISSUES ADDRESSED BY THE INVENTION

In a camera using the drop-in method with these construction types, when the cartridge is removed from the camera by the user, if the opening of the cartridge bay is facing down when the cover of the cartridge bay is opened, the cartridge may slip through the user's hand and fall onto the ground. In the case of second construction type described above, the cartridge may accidentally fly out of the camera and fall onto the ground as well, due to the spring force. In order to prevent such accidents, cameras equipped with a prevention means that prevents the cartridge from falling out have been proposed (e.g., Japanese Laid-Open Patent Hei 5-119391 and U.S. Pat. No. 5,258,793).

However, in these types of cameras, if during removal of the cartridge the user changes the orientation of the camera, such that the cartridge opening faces up, and attempts to remove the cartridge after the cartridge is prevented from falling out by the prevention means, the cartridge may become stuck in the fall prevention means so that it cannot be removed cleanly, or may accidentally slip through the user's hand and drop to the ground.

The present invention is directed to these problems. Its object is to provide a camera capable of preventing the cartridge from falling out or accidentally flying out, as well as enabling easy and fail-safe removal of the cartridge.

BRIEF STATEMENT OF THE INVENTION

In order to achieve this object, the present invention is a camera having a cartridge bay into which a film cartridge is inserted along the spool axis of the cartridge. The camera comprises a cartridge bay cover that can be opened and closed and that covers the opening of the cartridge bay in order to block light. A force applying means applies force to the film cartridge inserted in the cartridge bay in the direction in which the film cartridge is ejected out of the cartridge bay. A prevention means prevents the film cartridge from flying completely out of the cartridge bay due to the force applied by the force applying means, such that only a part of the film cartridge protrudes out of the camera. The prevention means operates in response to the opening of the cartridge bay cover, and when the cartridge bay cover is half-open, the prevention means is set at a position at which it prevents the film cartridge from flying out. When the cartridge bay cover is fully open, it is set at a retracted position at which it enables the removal of the film cartridge.

In a camera with this construction, during the process to eject the film cartridge out of the cartridge bay, when the cartridge bay cover has reached a half-open state, the film cartridge partially protrudes out of the cartridge bay due to its being forced in the direction of ejection by a force applying means. When this happens, in response to the movement of the cartridge bay cover, the prevention means is set at a position at which it prevents the film cartridge from accidentally flying out. Consequently, the film cartridge will not fall onto the ground. Then, when the cartridge bay cover has reached the fully open position, the prevention means moves to a retracted position in response to this movement so that it does not hinder the removal of the film cartridge, thereby allowing easy removal of the film cartridge.

DESCRIPTION OF THE ILLUSTRATED EMBODIMENT

Figure 1:
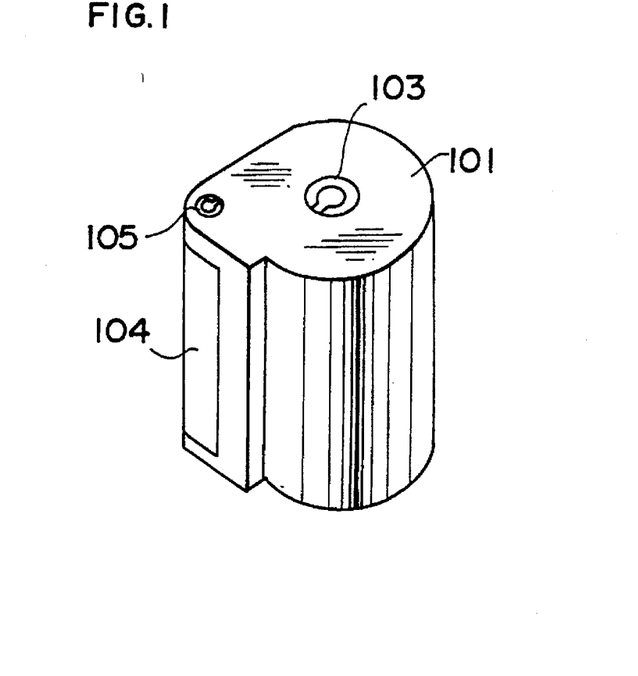
FIG. 1 is a perspective view showing a film cartridge used in the camera of one embodiment of the present invention.
Figure 2:
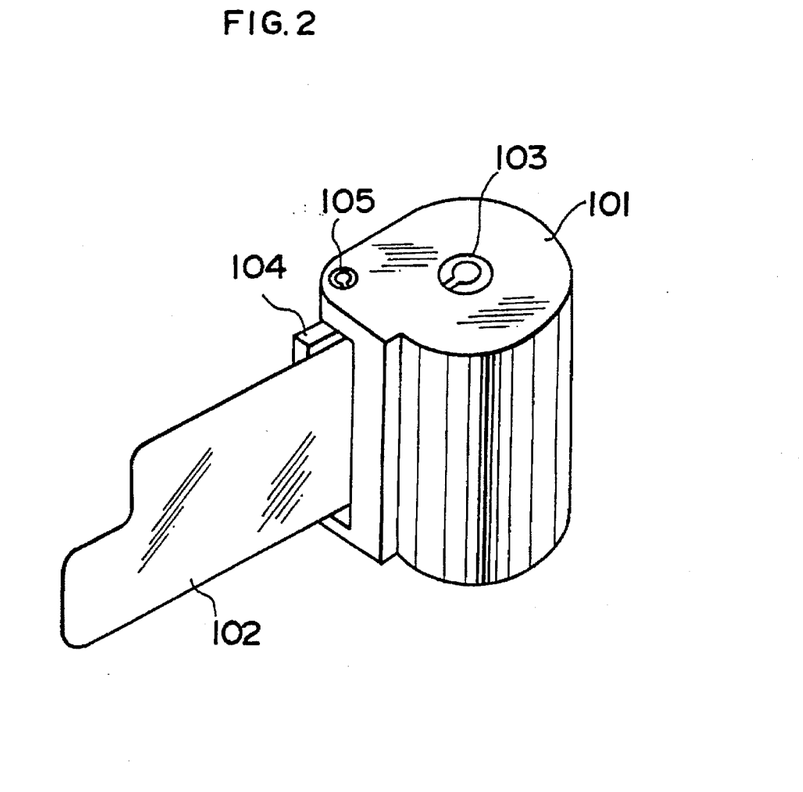
FIG. 2 is a perspective view showing the situation in which the light blocking door of the film cartridge is open.

One embodiment of the present invention is explained with reference to the drawings. FIGS. 1 and 2 are perspective views showing a film cartridge used in the camera of this embodiment. This film cartridge (hereinafter "cartridge") 101 completely houses a film 102 as shown in FIG. 1, when it is not inserted in the camera. The tail end of the film 102 is attached to a spool 103 used for film rewinding and feeding, and is wound around the spool 103. After being inserted in the camera, a light blocking door 104 to block light from the interior of cartridge 101 is opened by causing it to rotate around a light blocking door shaft 105, as shown in FIG. 2, and the spool 103 is caused to rotate, whereby the film 102 is pushed out of the cartridge 101.

Figure 3:
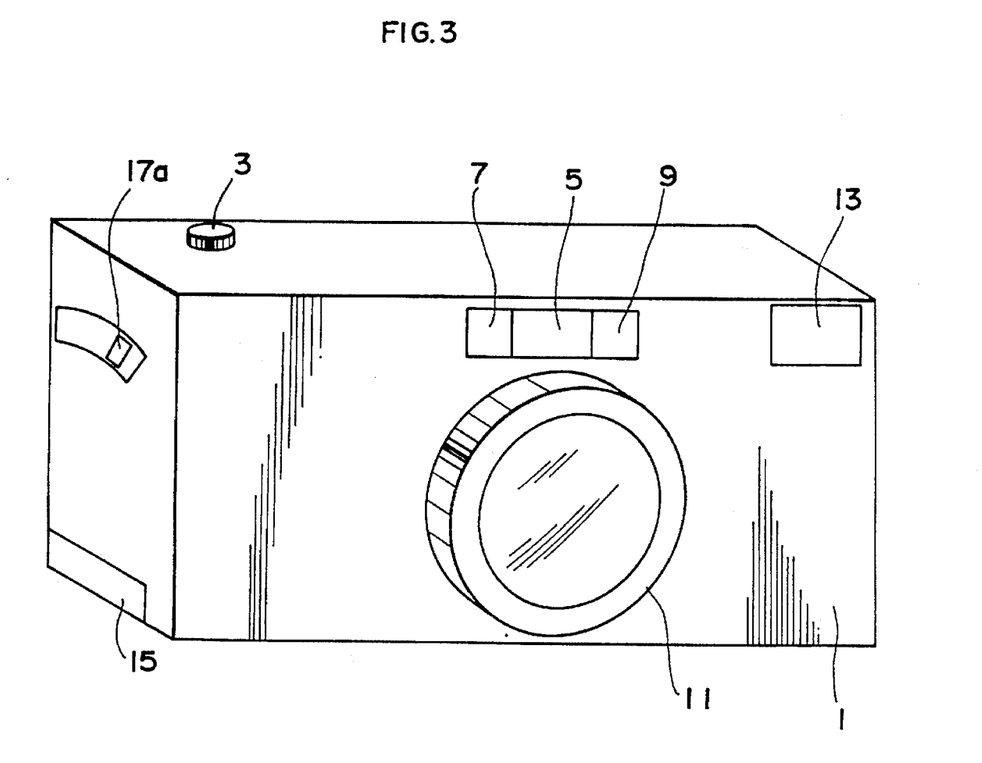
FIG. 3 is a perspective view showing the appearance of the camera.

FIG. 3 is a perspective view showing an overview of the construction of the camera of this embodiment. The camera 1 has a release button 3, a finder window 5, a distance measurement infrared beam projection window 7, a distance measurement infrared beam receptor window 9, a phototaking lens 11, a flash light window 13, and so forth. Further, at the bottom of the camera 1 is formed a cartridge bay cover 15 which opens and closes to allow insertion and removal of the cartridge 101. After this cartridge bay cover 15 is fully open, the cartridge 101 is inserted in or removed from the cartridge bay 21 (see FIG. 4). The cartridge bay cover 15 is opened with rotation pins 15a (FIG. 5) comprising the axis of rotation, or is locked when closed by means of a laterally moving operation member 17a of a cover lock member 17 (see FIG. 6) located on one side of the camera.

Figure 4:
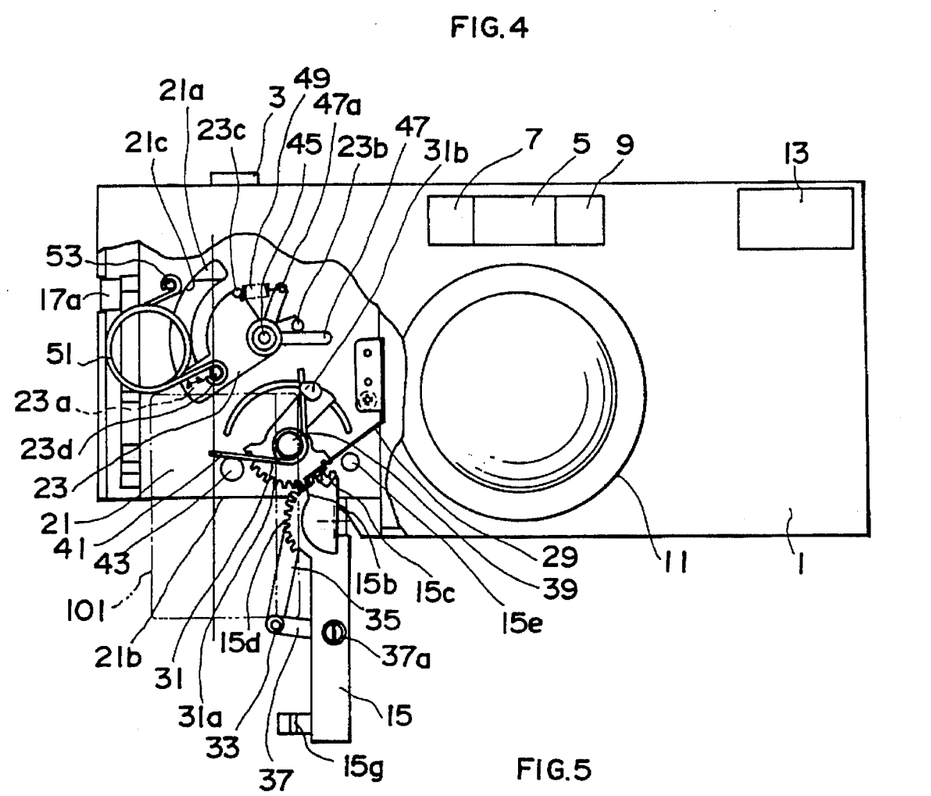
FIG. 4 is a front elevation of the camera with a partial cutaway view of the interior of the cartridge bay.
Figure 5:
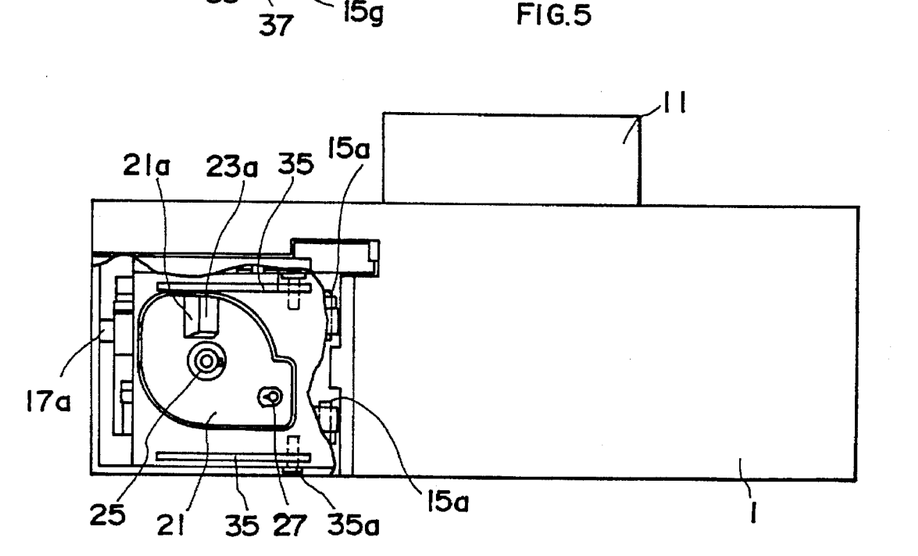
FIG. 5 is a bottom view of the camera with a partial cutaway view of the interior of the cartridge bay.

FIG. 4 shows a front elevation of the camera 1 in which the area around the cartridge bay 21 when the cartridge bay cover 15 is open is shown as a partial cutaway view. FIG. 5 shows the bottom of the camera 1 in which the area around the cartridge bay 21 without the cartridge 101 is shown as a partial cutaway view. Incidentally, some components, such as the cartridge bay cover 15, are omitted in FIG. 5.

The construction of the area around the cartridge bay 21 will first be explained. In the vicinity of the cartridge bay 21 (between a partitioning wall defining the cartridge bay 21 which is not shown in the drawings and the camera case) is located a push-out member 23 to push out the cartridge 101 from the cartridge bay 21. A push-out unit 23a formed on one part of this push-out member 23 is located deep inside the cartridge bay 21 and is retracted in a retraction area 21a formed at the bottom of the cartridge bay 21 (near the top of the camera) when the cartridge 101 is inserted in the cartridge bay 21, such that a helical torsion spring (hereinafter "toggle spring") 51 described below does not apply force to the cartridge 101. Also present are a spool drive shaft 25 to cause the spool 103 of the cartridge 101 to rotate to feed the film 102, and a light blocking door drive shaft 27 to cause the light blocking door shaft 105 to rotate to open and close the light blocking door 104, both of these shafts facing the cartridge bay 21.

There is also located on the inner surface of the cartridge bay cover 15 a spool pressing shaft, which is not shown in the drawings, to press the spool 103 of the cartridge 101 from the side of the cartridge bay cover 15 when the cartridge 101 is inserted in the cartridge bay 21. As for the cartridge 101, the spool 103 is supported at its top and bottom by the spool drive shaft 25 and the spool pressing shaft, and the vertical position of the spool 103 is determined by the spool drive shaft 25. The light blocking door drive shaft 27 controls the cartridge 101 so that it does not rotate. In this way, the cartridge 101 is positioned inside the cartridge bay 21 by three shafts and no other pressure is applied on it, such that it is maintained in a kind of floating state as described below.

The cartridge bay cover 15 can rotate around the rotation pins 15a. A click spring 29 engages with concave areas 15b and 15c formed on the cartridge bay cover 15 and keeps the cartridge bay cover 15 at a first position at which the cartridge bay cover 15 is partially open and at a second position at which the cartridge bay cover 15 is fully open. The force of the click spring 29 is regulated by a protrusion 15e formed on one side of the cartridge bay 21. A gear 15d is also formed on the cartridge bay cover 15, and engages with a gear 31a on a cover opening lever 31 at all times.

The cartridge bay cover 15 also has a fall prevention member 33 ("prevention means") to prevent the cartridge 101 from falling out. This fall prevention member 33 is rotatably supported at both ends by levers 35 and levers 37. Levers 35 and 37 are located at one end of the cartridge bay 21 and symmetrically along either side of the cartridge bay cover 15 such that they can rotate in planes parallel to the spool 103 of the cartridge 101. The levers 37 are each rotatably connected to the cartridge bay cover 15 on one end by means of shafts 37a, while they are rotatably supported on the other end by the fall prevention member 33, which is sandwiched by the levers 37 and also rotatably supports the levers 35 on one end of each. The levers 35 are rotatably connected to the inner surface of the cartridge bay 21 on the other end by shafts 35a (FIG. 5). The fall prevention member 33 is located such that it is parallel to the opening of the cartridge bay cover 15 (perpendicular to the sheet in FIG. 4) and is perpendicular relative to the levers 35 and 37.

The fall prevention member 33 moves to a position to face the opening 21b of the cartridge bay 21 as the cartridge bay cover 15 opens. The fall prevention member 33 is housed in a retraction area 15f (see FIG. 6(f)) formed in the cartridge bay cover 15 as the cartridge bay cover 15 closes.

The cover opening lever 31 will now be explained. The cover opening lever 31 can rotate around a shaft 39. On the cover opening lever 31 is formed a gear 31a which engages with the gear 15d on the cartridge bay cover 15, and these gears 15d and 31a engage with each other so that their rotational forces may be mutually transmitted. The cover opening lever 31 is given force by a helical torsion spring 41 such that it rotates clockwise in the situation shown in FIG. 4. The helical torsion spring 41 is supported on a shaft 39. One end is regulated by a protrusion 43 formed on one side of the cartridge bay 21, and its other end presses against a protrusion 31b formed on the cover opening lever 31.

The push-out member 23 will now be explained. The push-out member 23 can rotate around a shaft 45. There are four protrusions on the push-out member 23, and the push-out unit 23a, which is one of the four protrusions, reaches into the interior of the cartridge bay 21 through a regulating frame 21c formed on the partitioning wall defining the cartridge bay 21. On the push-out member 23 is also formed a protrusion 23b which can engage with the long side of a lever 47. The regulating frame 21c is configured by two arcs having different radii and a regulating line to regulate the rotation range of the push-out unit 23a which rotates around the shaft 45. The push-out unit 23a can move such that it pushes the cartridge 101 out of the cartridge bay 21, i.e. it lifts up cartridge 101 when the camera is inverted. The lever 47 is rotatably supported around the shaft 45. An extension spring 49 is hooked on a spring hook hole 47a and on the protrusion 23c of the push-out member 23, and applies force to the lever 47 such that its long side comes into contact with the protrusion 23b.

One end of the toggle spring 51, which causes the push-out member 23 to rotate, is hooked on a protrusion 53 formed on one side of the cartridge bay 21, and the other end is hooked on a protrusion 23d formed on the push-out member 23. The toggle spring 51 applies force to the protrusion 23d and protrusion 53 such that they are separated from each other at all times, and has a snap action function. Therefore, in the situation in which the protrusion 23d and the protrusion 53 are closest (the situation in FIG. 6(d) described below), no force is applied in either direction. When the push-out member 23 rotates even slightly in either direction from this situation, the push-out member 23 is given force by the toggle spring 51 such that it continues to rotate in the same direction.

The distance between the protrusion 23d on the push-out member 23 and the shaft 45 is smaller than the distance between the push-out unit 23a and the shaft 45. Consequently, when the push-out member 23 moves from the lowest position to the highest position on the regulating frame 21c, the amount of movement of the protrusion 23d is smaller than the amount of movement of the push-out unit 23a. Therefore, by having the toggle spring 51 hooked on the protrusion 23d which is closer to the shaft 45 than the push-out unit 23a, the amount of movement of the toggle spring 51 is reduced, and space is conserved.

Figures 6A, 6B:
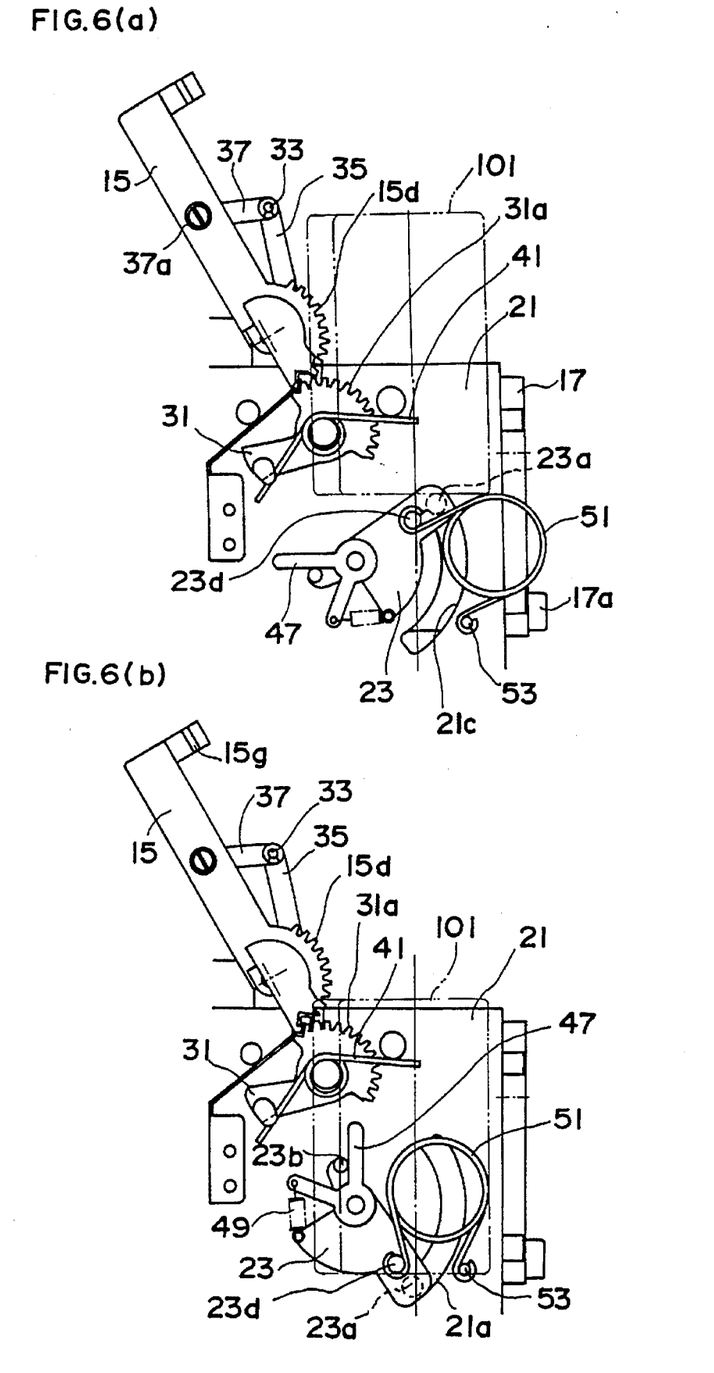
FIGS. 6(a) and 6(b) show a situation in which the film cartridge is inserted in the cartridge bay.
Figure 6C:
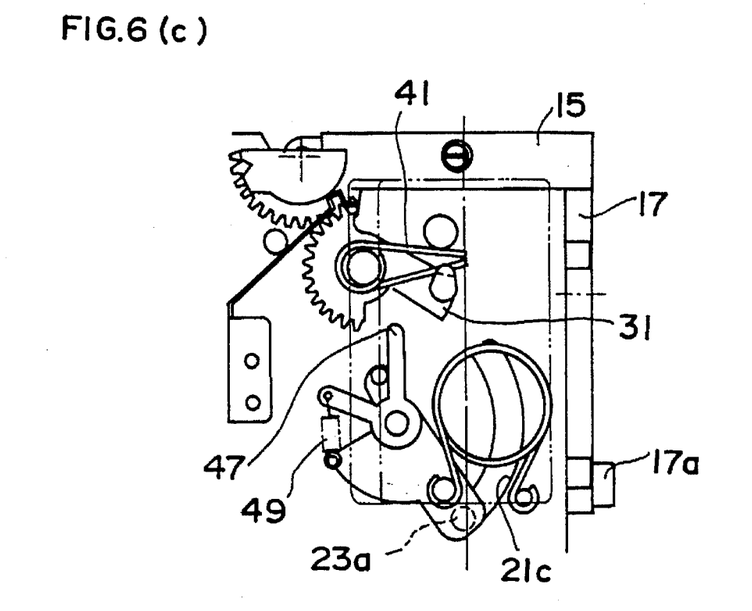
FIG. 6(c) shows a situation in which the cartridge bay cover is closed.
Figure 6D:
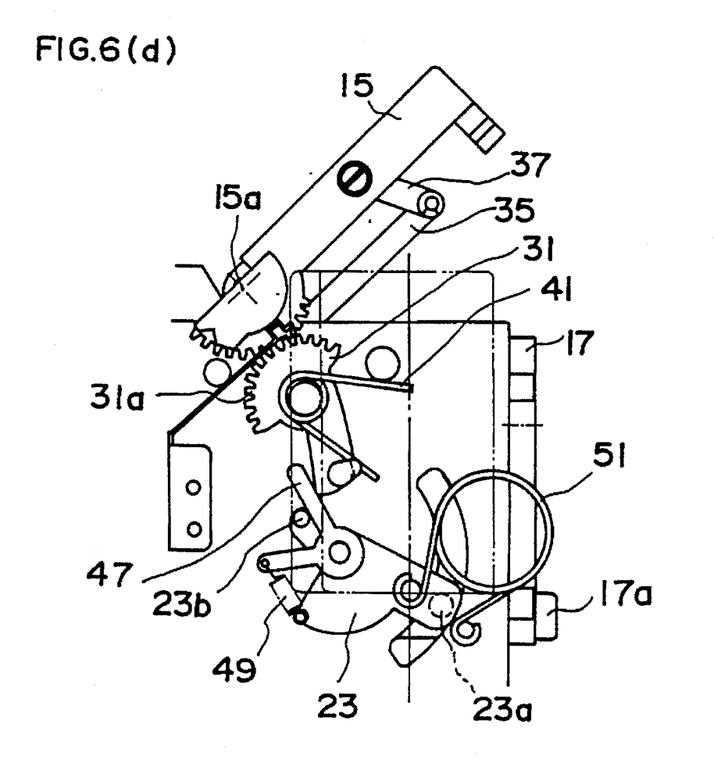
FIG. 6(d) shows a situation in which opening of the cartridge bay cover has started again in order to remove the film cartridge.
Figure 6E:
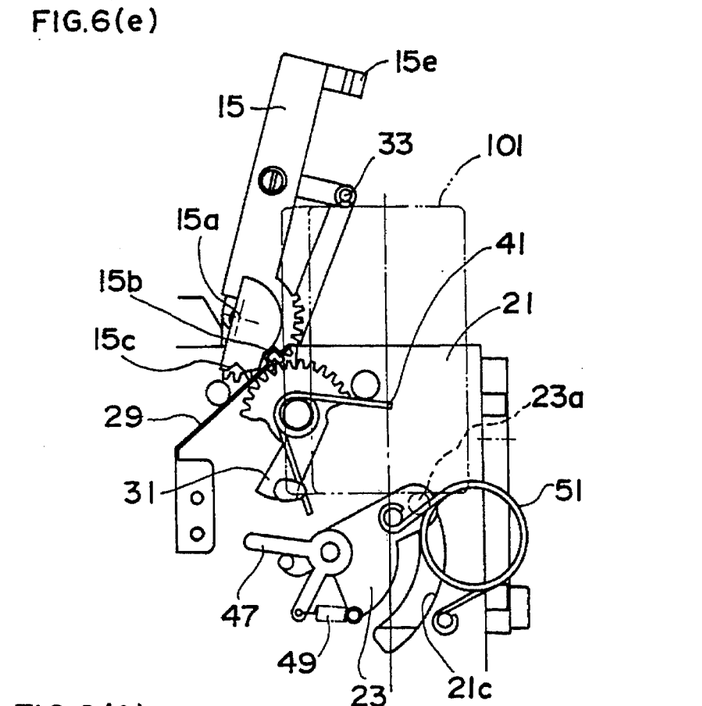
FIG. 6(e) shows a situation in which the cartridge bay cover is half-open.
Figure 6F:
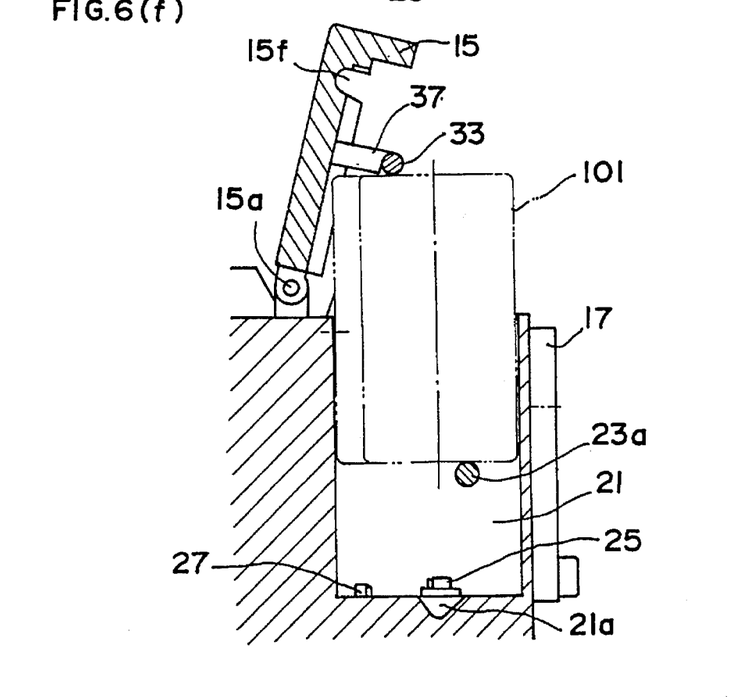
FIG. 6(f) is a cross-sectional view of the cartridge bay and cartridge bay cover in the situation of FIG. 6(e).

The method of insertion and removal of the cartridge 101 into and from the camera 1, constructed in the fashion described above, will now be explained with reference to FIG. 6. These drawings show the camera in an upside down position. FIG. 6(a) shows a situation in which the cartridge bay cover 15 is fully open and the cartridge 101 is only partially inserted in the cartridge bay 21. FIG. 6(b) shows a situation in which the cartridge 101 is fully inserted in the cartridge bay 21. FIG. 6(c) shows a situation in which the cartridge bay cover 15 is closed. FIG. 6(d) shows a situation in which the cartridge bay cover 15 is open approximately 45° while the cartridge 101 is being pushed up. FIG. 6(e) shows a situation in which the cartridge bay cover 15 is open and the cartridge 101 is fully pushed up. FIG. 6(f) is a cross-sectional view of the situation in FIG. 6(e).

As shown in FIG. 6(a), in the situation in which the cartridge bay cover 15 is open to the maximum, the cartridge 101 is dropped from the top of the cartridge bay 21 along the axis of the spool 103 of the cartridge 101. The push-out member 23 is given a force by the toggle spring 51 to urge it in the counterclockwise direction in the drawing. In the situation shown in the drawing, it is stopped at the highest position within the range in which the regulating frame 21c allows it to move. Consequently, the cartridge 101 falls only until it hits the top of the push-out unit 23a of the push-out member 23.

When the cartridge 101 is pushed down so that it can be inserted in the cartridge bay 21, from the situation shown in FIG. 6(a), the bottom of the cartridge 101 pushes down on the push-out unit 23a, as shown in FIG. 6(b), as a result of which the push-out member 23 rotates clockwise and the protrusion 23b pushes the long side of the lever 47, due to which the lever 47 also rotates clockwise. The toggle spring 51 is gradually charged and is most charged when the protrusion 23d and the protrusion 53 are the closest. When the cartridge 101 is pushed down further, causing the push-out member 23 to rotate, that gives rise to a snap action by the toggle spring 51 which works such that the push-out member 23 rotates clockwise. The cartridge 101 is then fully inserted in the cartridge bay 21, the push-out member 23 is given force by the toggle spring 51 so that it will rotate clockwise, and the push-out unit 23a retracts into the retraction area 21a located at the bottom of the cartridge bay 21, settling into the situation shown in the drawing. In this situation, the cartridge 101 no longer receives any force from the toggle spring 51, whereby the cartridge 101 is in a kind of floating state.

When the cartridge bay cover 15 is rotated in the direction to close it, i.e. clockwise, from the situation shown in FIG. 6(b), the cover opening lever 31 is made to rotate counterclockwise against the force of the helical torsion spring 41 by the engagement of the gears 15d and 31a in response to the rotation of the cartridge bay cover 15, whereby the helical torsion spring 41 is gradually charged. During its rotation, the cover opening lever 31 comes into contact with the lever 47, after which it pushes the lever 47 and causes the lever 47 to rotate clockwise. When the lever 47 rotates clockwise, the force of the extension spring 49 increases, whereby the extension spring 49 applies force to the push-out member 23 so that it rotates clockwise. However, because the portion of the push-out member 23 connecting it with the push-out unit 23a through the regulating frame 21c is located at the lowest end of the regulating frame 21c in the drawing, the push-out member 23 does not rotate.

Then, as the cover opening lever 31 continues to rotate, the cover opening lever 31 and the lever 47 separate, and the lever 47 is returned to the initial position (FIG. 6(b) or 6(c)) by the force of the extension spring 49. FIG. 6(c) shows the situation in which the cartridge bay cover 15 is completely closed. In this situation, the levers 35 and 37 (see FIG. 6(b)) retract into grooves formed on the cartridge bay cover 15 (not shown in the drawings) and the fall prevention member 33 retracts into the retraction area 15f formed on the cartridge bay cover 15 (see FIG. 6(f)). When the cartridge bay cover 15 is closed, a lock 15g of the cartridge bay cover 15 hooks on the engaging unit of the cover lock member 17, whereby the cartridge bay cover 15 is locked. Following this locking, the light blocking door 104 of the cartridge 101 opens to feed the film 102 out of the cartridge 101 into the camera 1 and photo-taking takes place. When photo-taking is completed, after the film 102 is rewound into the cartridge 101 and the light blocking door 104 closes, the cartridge 101 is removed from the cartridge bay 21.

In FIG. 6(c), when the operation unit 17a of the cover lock member 17 is moved and the lock hooked on the cartridge bay cover 15 is unlocked, the cover opening lever 31 starts rotating clockwise by means of the force of the helical torsion spring 41, as shown in FIG. 6(d). The rotation of the cover opening lever 31 is transmitted to the cartridge bay cover 15 via gears 31a and 15d. The cartridge bay cover 15 rotates counterclockwise around the rotation pins 15a, whereby the levers 35 and 37 move in response and come out of the grooves (not shown in the drawings). After a small amount of rotation, the cover opening lever 31 comes into contact with the long side of the lever 47, which is caused to rotate counterclockwise. The lever 47 then presses the protrusion 23b of the push-out member 23, as a result of which the push-out member 23 rotates counterclockwise together with the lever 47.

Although the push-out member 23 is given force by the toggle spring 51 to make it rotate clockwise, the force applied by the helical torsion spring 41 is larger, which causes it to rotate counterclockwise. Since the cartridge 101 is situated on top of the push-out unit 23a of the push-out member 23, it rises along with the rotation of the push-out member 23. The toggle spring 51 is gradually charged by the counterclockwise rotation of the push-out member 23. FIG. 6(d) shows the situation in which the toggle spring 51 is charged most.

As shown in FIGS. 6(e) and 6(f), a slight further counterclockwise rotation of the push-out member 23 from the situation in FIG. 6(d) leads the toggle spring 51 to a snap action, whereby the push-out member 23 is given force by the toggle spring 51 such that it will rotate counterclockwise, and the lever 47 is also pulled closer by the extension spring 49 so that it rotates together with the push-out member 23. Consequently, the lever 47 and the cover opening lever 31 separate, as shown in FIGS. 6(e) and 6(f), and the push-out member 23 rotates solely by the force applied by the toggle spring 51. The cartridge 101 is also lifted by the force of the toggle spring 51. The rotation of the push-out member 23 is stopped at a position at which the push-out unit 23a is at the highest point in the regulating frame 21c, whereby the cartridge 101 is pushed out of the cartridge bay 21 to the maximum degree. In this situation, the cartridge 101 is prevented from flying out or falling out of the cartridge bay 21 by means of the fall prevention member 33. The rotational torque impressed on the cartridge bay cover 15 via the force of the helical torsion spring 41 is suppressed by virtue of the click spring 29 engaging with the concave area 15b, and the cartridge bay cover 15 stops at the position shown in FIGS. 6(e) and 6(f). Subsequently, the cartridge bay cover 15 is rotated manually to a position where it does not hinder the removal of the cartridge 101 (the position shown in FIG. 6(a)), and the cartridge 101 is removed.

Using the camera of this embodiment, when the cartridge bay cover 15 is opened in order to remove the cartridge 101, the cartridge bay cover 15 first stops at a partially open position, and simultaneously the fall prevention member 33 moves to a position at which it prevents the cartridge 101 from falling out or accidentally flying out. When the cartridge bay cover 15 is further rotated manually so that it is fully open, the fall prevention member 33 moves out of the path of the cartridge 101 such that the cartridge 101 may be removed. With this construction, the problem that the cartridge 101 cannot be removed because it is stuck against the fall prevention member 33 after the cartridge 101 is prevented from falling out is eliminated, and the cartridge 101 may be removed from the cartridge bay 21 easily and without failure. Further, if the user opens the cartridge bay cover 15 by mistake when the opening 21b of the cartridge bay 21 is facing down, the cartridge 101 will not fall to the ground unless the cartridge bay cover 15 is fully opened manually by the user, as a result of which placement and removal of the cartridge 101 may be performed safely.

In addition, in the situation in which the cartridge 101 is inserted in the cartridge bay 21, the push-out unit 23a which transmits the force of the helical torsion spring 41 to the cartridge 101 retracts into the retraction area 21a so that no pressure is applied to the cartridge 101. Consequently, the cartridge 101 floats inside the cartridge bay 21. Therefore, the spool 103 is accurately positioned without the cartridge 101 moving from the proper vertical position, which makes the rotations of the spool 103 and the light blocking door shaft 105 stable and controlled, and also keeps the rotational torque for the spool 103 to feed the film 102 small. The present invention is not limited to the construction of this embodiment and may be realized in various other alternative constructions. For example, in the embodiment above, a toggle spring 51 is used as a force applying means to eject the film cartridge out of the cartridge bay, but other types of springs or elastic components may be used instead.

As described above, using the camera of the present invention, when the film cartridge in the cartridge bay is removed, as long as the cartridge bay cover is partially open, a prevention means that prevents the film cartridge, which is given a force in the direction to be ejected by a force applying means, from flying out of the cartridge bay is set at a prevention position, and thus the film cartridge is prevented from being further ejected, while part of it protrudes out of the camera, and it is thereby prevented from falling. When the cartridge bay cover is subsequently fully opened, the prevention means is set to a retracted position and therefore the prevention means does not hinder the removal of the film cartridge. Consequently, the film cartridge can be prevented from accidentally flying out or falling out of the cartridge bay and at the same time the film cartridge cay be removed easily without failure.

What is claimed is:

1. A film housing device comprising:
   a cartridge bay into which a film cartridge is loaded;
   a cover for covering an opening of said cartridge bay, wherein said cover is movable between a closed position, a partially open position, and full-open position;
   a force applying device for applying force to a film cartridge loaded in said cartridge bay in a direction to eject the film cartridge out of said cartridge bay; and
   a prevention member for preventing the film cartridge from completely leaving said cartridge bay by contacting a leading edge of a film cartridge with respect to the direction of said force when said cover is at the partially open position, and enabling removal of the film cartridge when said cover is at the full-open position.

2. The film housing device according to claim 1, wherein said prevention member is supported by said cover.

3. The film housing device according to claim 2, wherein said prevention member is retracted within said cover when said cover is at the closed position and sticks out of said cover when said cover is at the partially open position.

4. The film housing device according to claim 1, further comprising a retaining device for retaining said cover at the partially open position and the full-open position.

5. The film housing device according to claim 1, wherein said film cartridge is inserted into said cartridge bay along a spool axis of said cartridge.

6. The film housing device according to claim 1, wherein said film housing device forms part of a camera.

7. A film housing device comprising:
   a cartridge bay into which a film cartridge is loaded;
   a cover for covering an opening of said cartridge bay wherein said cover is movable between a closed position and open position;
   a force applying device for applying force to a film cartridge loaded in said cartridge bay in a direction to eject the fill cartridge out of said cartridge bay;
   a prevention member, which moves together with said cover and is capable of stopping in a path of a film cartridge during its removal from the opening of said cartridge bay; and
   an arranging device for positioning said prevention member in the path of film cartridge removal in response to movement of said cover from the closed position toward the open position and retracting said prevention member from the path of film cartridge removal as said cover opens more widely.

8. The film housing device according to claim 7, wherein said prevention member is supported by said cover.

9. The film housing device according to claim 8, wherein said prevention member is retracted into said cover when said cover is at the closed position and sticks out of said cover when said cover is at the open position.

10. The film housing device according to claim 7, wherein said film cartridge is inserted into said cartridge bay along a spool axis of said cartridge.

11. The film housing device according to claim 7, wherein said film housing device forms part of a camera.

12. A film housing device comprising:
   a cartridge bay into which a film cartridge is loaded;
   a cover for covering an opening of said cartridge bay, wherein said cover is movable between a closed position, an intermediate position, and an open position;
   a prevention member for preventing the film cartridge from completely leaving said cartridge bay by contacting a leading edge of a film cartridge, in the direction of removal of the cartridge from said cartridge bay, when said cover is at the intermediate position, and enabling removal of the film cartridge when said cover is at the open position; and
   a retaining device for retaining said cover at the intermediate position.

13. The film housing device of claim 12, further including a locking device for locking said cover in said closed position, and means for automatically moving said cover from said closed position to said intermediate position upon release of said locking device.

14. A film housing device comprising:

a cartridge bay into which a film cartridge is loaded;

a cover for covering an opening of said cartridge bay, wherein said cover is movable between a closed position, a partially open position, and full-open position;

a force applying device for initiating movement of a film cartridge loaded in said cartridge bay in a direction to eject the film cartridge out of said cartridge bay as said cover moves from said closed position to said partially open position; and a prevention member for preventing the film cartridge from completely leaving said cartridge bay when said cover is at the partially open position, and enabling removal of the film cartridge when said cover is at the full-open position.

15. A film housing device comprising:

a cartridge bay into which a film cartridge is loaded;

a cover for covering an opening of said cartridge bay, wherein said cover is movable between a closed position, a partially open position, and full-open position;

a force applying device for applying force to a film cartridge loaded in said cartridge bay in a direction to eject the film cartridge out of said cartridge bay; and a prevention member for preventing the film cartridge from completely leaving said cartridge bay when said cover is at the partially open position, and enabling removal of the film cartridge when said cover is at the full-open position, wherein said prevention member is retracted within said cover when said cover is at the closed position and sticks out of said cover when said cover is at the partially open position.

16. A film housing device comprising:

a cartridge bay into which a film cartridge is loaded;

a cover for covering an opening of said cartridge bay, wherein said cover is movable between a closed position, a partially open position, and full-open position;

a force applying device for applying force to a film cartridge loaded in said cartridge bay in a direction to eject the film cartridge out of said cartridge bay;

a prevention member for preventing the film cartridge from completely leaving said cartridge bay when said cover is at the partially open position, and enabling removal of the film cartridge when said cover is at the full-open position; and a retaining device for retaining said cover at the partially open position and the full-open position.

* * * * *